(12) United States Patent
Marozas et al.

(10) Patent No.: US 11,627,050 B2
(45) Date of Patent: Apr. 11, 2023

(54) DISTINGUISHING NETWORK CONNECTION REQUESTS

(71) Applicant: Cujo LLC, El Segundo, CA (US)

(72) Inventors: Leonardas Marozas, Vilnius (LT); Filip Savin, Vilnius (LT)

(73) Assignee: Cujo LLC, Walnut, CA (US)

(*) Notice: Subject to any disclaimer, the term of this patent is extended or adjusted under 35 U.S.C. 154(b) by 117 days.

(21) Appl. No.: 16/913,312

(22) Filed: Jun. 26, 2020

(65) Prior Publication Data
US 2021/0409276 A1 Dec. 30, 2021

(51) Int. Cl.
*H04L 41/12* (2022.01)
*H04L 9/40* (2022.01)

(52) U.S. Cl.
CPC ............ *H04L 41/12* (2013.01); *H04L 63/101* (2013.01)

(58) Field of Classification Search
CPC .............................. H04L 41/12; H04L 63/101
See application file for complete search history.

(56) References Cited

U.S. PATENT DOCUMENTS

| | | |
|---|---|---|
| 9,419,942 B1 | 8/2016 | Buruganahalli et al. |
| 10,432,646 B2 | 10/2019 | Hentunen |
| 2011/0214187 A1* | 9/2011 | Wittenstein ......... H04L 63/1425 726/25 |
| 2013/0152153 A1* | 6/2013 | Weiser ................ H04L 65/1069 726/1 |
| 2014/0337991 A1* | 11/2014 | Croll ....................... G06F 21/60 726/26 |
| 2017/0374017 A1 | 12/2017 | Gautam et al. |
| 2021/0136038 A1* | 5/2021 | Stokes ................ H04L 63/0236 |
| 2021/0157874 A1* | 5/2021 | Golan ................. G06F 16/9566 |
| 2021/0400085 A1* | 12/2021 | Stokes ................ H04L 63/1458 |

OTHER PUBLICATIONS

Extended European Search Report for European Patent Application No. 21181625.1, dated Nov. 23, 2021, 7 pages.

* cited by examiner

*Primary Examiner* — Chris Parry
*Assistant Examiner* — Steven C Nguyen
(74) *Attorney, Agent, or Firm* — Dority & Manning, P.A.

(57) ABSTRACT

A network apparatus detects connection requests and extracts related data. The data is analyzed to determine whether the host is in an active state, whether the host matches a domain referrer and an amount of time from a last connection request. If it is detected that the host is not in an active state, the host is not matching the domain referrer and the amount of time from the last connection request exceeds a predetermined new session threshold, then a connection request is classified as a main request. If the amount of time from the last connection request is below a predetermined continuous session threshold, then any connection requests following the main request are classified as sub-requests. If the domain of host in the active state does not match current host for a sub-request, the sub-request is classified as a third-party request.

16 Claims, 3 Drawing Sheets

DISTINGUISHING NETWORK CONNECTION REQUESTS

TECHNICAL FIELD

The present application relates generally to network security, and specifically to distinguishing network connection requests in a computer network.

BACKGROUND

Website visitor tracking is commonly used to analyse visitor behaviour and acquire sensitive data related to private individuals. Excessive tracking wastes resources, time and bandwidth, third-party trackers also follow individuals around the web and the data acquired by the trackers can be used for malicious or even criminal purposes. However, personalization of user experience using targeted advertising or content selection for example is also a result of user behaviour tracking and it cannot be fully discarded in today's interconnected world.

SUMMARY

According to an aspect of the invention there is provided a method as specified in claim 1.

According to other aspect of the invention, there is provided an apparatus in a computer network system as specified in claim 12.

According to other aspect of the invention, there is provided a non-transitory computer-readable medium comprising stored program code, the program code comprised of computer-executable instructions that, when executed by a processor, causes the processor to operate as specified in claim 20.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
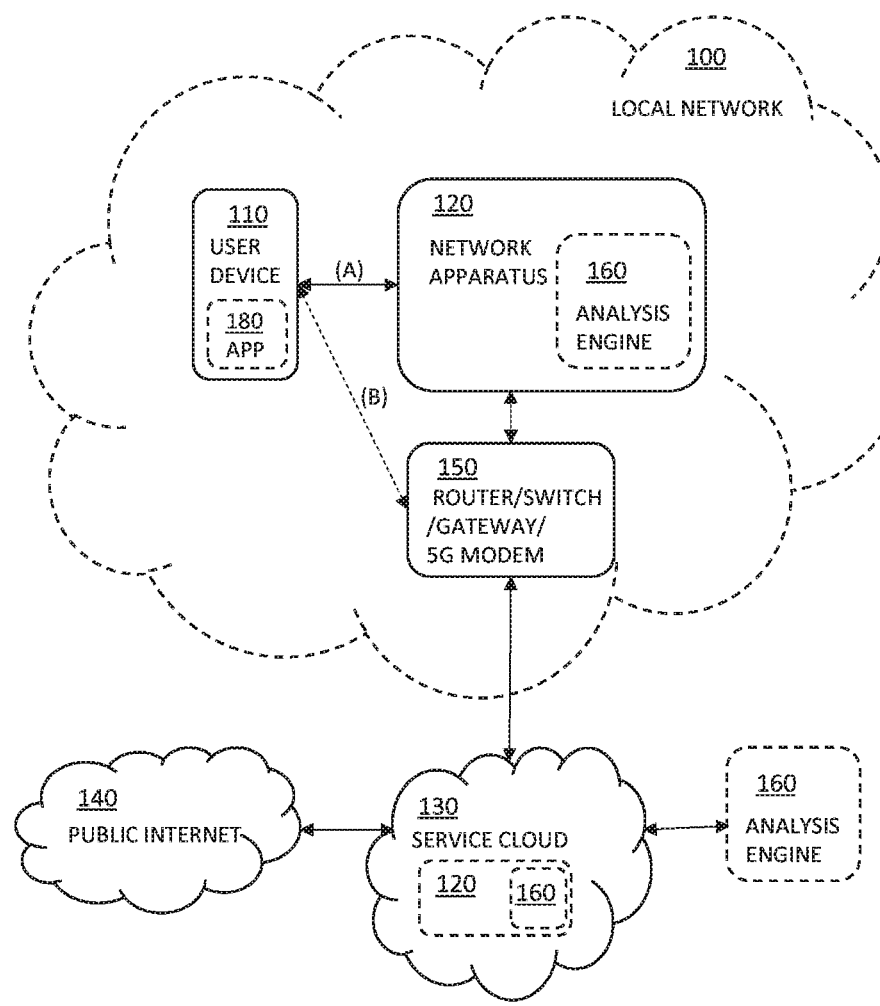
FIG. 1 illustrates an example system environment for a network apparatus in a computer network system.

The figures and the following description relate to the example embodiments by way of illustration only. Alternative embodiments of the structures and methods disclosed herein will be readily recognized as viable alternatives that may be employed without departing from the principles of what is claimed.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Website visitor tracking is commonly used to analyse visitor behaviour and acquire sensitive data related to private individuals. Excessive tracking wastes resources, time and bandwidth, third-party trackers also follow individuals around the web and the data acquired by the trackers can be used for malicious or even criminal purposes. However, personalization of user experience using targeted advertising or content selection for example is also a result of user behaviour tracking and it cannot be fully discarded in today's interconnected world.

There are different methods to ensure user privacy and protection from tracking such as blocking access to specific domains (network-based solutions) and blocking specific requests (browser-based solutions). These methods require client-side code and often result in degraded user experience including inaccessible resources and broken websites.

When a user visits a website, several requests are made by the web browser. First one is to visit the website (main request) and this is followed by sub-requests to resources specified by the content received in response to the main request. These sub-requests can be resources located on the same domain (first-party sub-request) or external domains (third-party sub-requests). The third-party sub-requests to the same resource that are made by the same browser during visiting different websites can be used for user tracking by the third party controlling the resource, thus violating user privacy. Today, when visiting a website there may be numerous trackers loaded without user being aware.

There are needs for accurate methods to distinguish the main and sub-requests at a network layer and bringing the level of control previously available only at application layer in browser-based solutions to the network layer.

FIG. 1 illustrates schematically an example of a system environment for a network apparatus 120. The system environment illustrated in FIG. 1 includes a local network 100 that may include one or more devices 110 with a client application 180, the network apparatus 120, a local router/switch 150, and an analysis engine 160. The example system also includes a service cloud 130, such as a network operator's cloud and the Internet 140. The analysis engine 160 may reside in the local network, in the service cloud 130 or elsewhere in the network. There may also be more than one analysis engines 160 thus enabling at least part of the analysis being processed in more than one analysis engines. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

In an embodiment, the device 110 may communicate (A) via the network apparatus 120 residing in the local network 100. In another embodiment, the device 110 may communicate (B) directly via a network gateway or a modem 150, for example when the device is not in the local network 100. In an embodiment, the network operators may deploy a service platform on their broadband gateways 150 provided to customers and in their own cloud environments 130. The user device(s) 110 may also be configured to use the services provided by the service cloud 130 by one or more applications 180 installed on the device(s) 110.

The device 110 may be any computer device having Internet browsing capabilities, such a smartphone, laptop or a tablet. The network apparatus 120 collects information e.g. about the local network 100, including data about the network traffic through the local network 100 and data identifying devices in the local network 100, such as any smart appliances and user devices 110. The network apparatus 120 is configured to receive traffic control instructions from the analysis engine 160 and to process network traffic based on the traffic control instructions. Processing the network traffic through the local network 100, for example, can include restricting where network traffic can travel, blocking network traffic from entering the local network 100, redirecting a copy of network traffic packet or features of those packets to the analysis engine 160 for analysis (e.g., for malicious behaviour), or quarantining the network traffic to be reviewed by a user (e.g., via the user device 110) or network administrator. In some embodiments, the functionality of the network apparatus 120 is performed by a device that is a part of the local network 100, while in other embodiments, the functionality of the network apparatus 120 is performed by a device outside of the local network 100.

The network apparatus 120 may be configured to monitor traffic that travels through the local network 100. In some embodiments, the network apparatus 120 can be a device that is a part of the local network 100. The network apparatus 120 can be connected to the local network 100 using a wired connection (e.g. via an Ethernet cable connected to a router) or using a wireless connection (e.g. via a Wi-Fi connection). In some embodiments, the network apparatus 120 can comprise multiple devices. In some embodiments, the network apparatus 120 can also perform the functions of the local network router 150 for the local network 100.

In some embodiments, the network apparatus 120 may intercept traffic in the local network 100 by signaling to the user device 110 that the network apparatus 120 is router 150. In some embodiments, the network apparatus 120 replaces the default gateway or gateway address of the local network 100 with its own internet address. In some embodiments, the local network 100 can be structured such that all network traffic passes through the network apparatus 120, allowing the network apparatus 120 to physically intercept the network traffic. For example, the network apparatus 120 can serve as a bridge through which all network traffic must travel to reach the router 150 of the local network 100.

The analysis engine 160 may receive and analyze network traffic data (e.g., forwarded by the network apparatus 120) associated with devices on the computer network. The analysis engine 160 may be implemented within a remote system (e.g., a cloud server) or within the local network 100. The analysis engine 160 may perform operations that are computationally expensive for the network apparatus 120 to perform. In some embodiments, the analysis engine 160 replaces the network apparatus 120 by performing the functionalities of the network apparatus 120. In these embodiments, the local network router 150 may be configured to forward network traffic to the analysis engine 160. In some embodiments, the analysis engine 160 communicates with other devices on the computer network. In some embodiments, the analysis engine 160 is integrated into the network apparatus 120.

The local network 100 is a local area network (LAN) that comprises the one or more devices 110, network apparatus 120, and local network router 150. The local network 100 may be used for a number of purposes, including a home network or a network used by a business. The local network 100 is connected to the internet 140, allowing devices within the local network 100, including the user device 110, to communicate with devices outside of the local network 100. The local network 100 may be a private network that may require devices to present credentials to join the network, or it may be a public network allowing any device to join. In some embodiments, other devices, like personal computers, smartphones, or tablets, may join local network 100.

The internet 140 and the local network 100 may comprise any combination of LANs and wide area networks (WANs), using both wired and wireless communication systems. In some embodiments, the internet 140 and the local network 100 use standard communications technologies and protocols. Data exchanged over the internet 140 and the local network 100 may be represented using any suitable format, such as hypertext markup language (HTML) or extensible markup language (XML). In some embodiments, all or some of the communication links of the internet 140 and the local network 100 may be encrypted using any suitable technique or techniques.

The user device 110 is a computing device capable of receiving user input as well as transmitting and/or receiving data via the Internet 140 or local network 100. In some embodiments, a user device 110 is a conventional computer system, such as a desktop or a laptop computer. Alternatively, a user device 110 may be a device having computer functionality, such as a personal digital assistant (PDA), a mobile telephone, a smartphone, or another suitable device. The user device 110 is a network device configured to communicate with the Internet 140 or local network 100. In some embodiments, the user device 110 executes an application (e.g., application 180) allowing a user of the user device 110 to interact with other network devices, such as the smart appliances, the network apparatus 120, the router 150, or the analysis engine 160. For example, the user device 110 executes a browser application to enable interaction between the user device 110 and the network apparatus 120 via the local network 100.

The client application 180 is a computer program or software application configured to run on the user device 110. For example, the application 180 is a web browser, a mobile game, an email client, or a mapping program. The user device 110 can have any number of applications 180 installed. The application 180 may communicate, via the user device 110, with devices inside and outside of the local network 100.

The application 180 operates in either an active or a passive state. In a passive state, the application is running in the background of the user device 110 or is running on an idle device or in an idle state and may have reduced functionality. In an active state, the application 180 may be receiving input from a user and may have increased functionality compared to the passive state. Thus, in an active state, the application 180 may transmit and receive increased levels of network traffic compared to the passive state.

Detecting and Differentiating Traffic on Network Layer

When observing network traffic that is passing through a network apparatus 120, such as a router, connection initialization requests are captured. Relations between them are unknown. It is unknown if the requests were made by same browser session, or some other application, but following information can be extracted for further analysis:
- timestamp—communication timestamp
- protocol—communication protocol; http or https
- MAC—MAC (Media Access Control) address of a device sending request
- sport—source TCP (Transmission Port Protocol) port
- host—FQDN (Full Qualified Domain Name) of URL (Uniform Resource Locator) for HTTP (Hypertext Transfer Protocol), or SNI (Server Name Indication) for HTTPS (Hypertext Transfer Protocol Secure)
- time—time when packet was received
- window—TCP window size
- tot_len—total length of IP packet
- referer—HTTP request header can have referrer that can be used to determine $3^{rd}$ party request. HTTPS has referrer encrypted thus not available on network layer.

In HTTP cases, using referrer tag, it is possible to detect third-party request of resources. However, knowing the increasing number of HTTPS usage over HTTP, such detection becomes less relevant.

Empirical evaluation shows the following traffic patterns in web browsing activities:
- Several requests to auto-complete service (only if user is typing address manually. Auto-completion service is browser-dependent.)
- Main request being sent
- Sub-requests to first- or third-party resources starts.

Router level communication monitoring covers all communication made by the initial household and it is not limited to browsing activities of an isolated device. In this context it is called noise. Sources of noise can be: communications initiated by operating system services, communications by user installed software and applications on household devices, multiple browsers or browser tabs communications, concurrent web pages accesses, OCSP (Online Certificate Status Protocol) queries or other. Decreasing the amount of noise has an impact on the end result and is one of the challenges.

Figure 2:
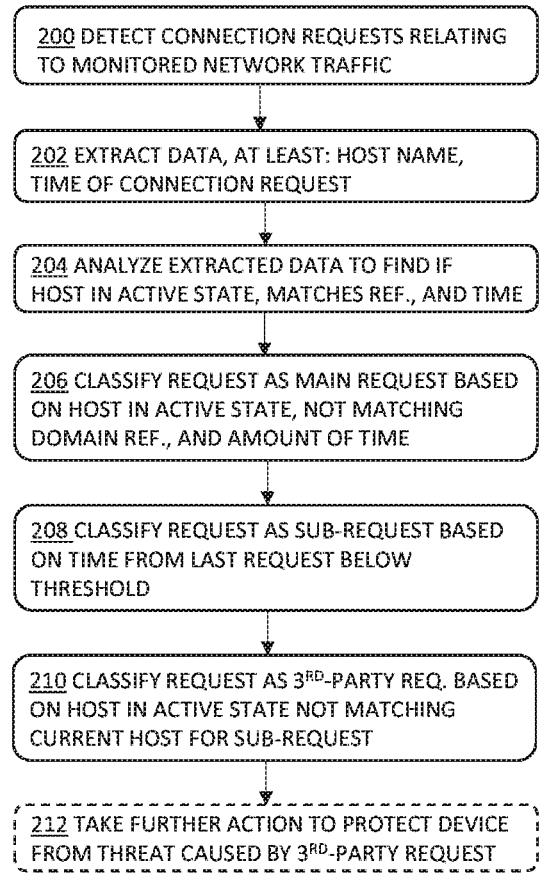
FIG. 2 is a block diagram of an apparatus, according to one embodiment.

FIG. 2 is a flow diagram illustrating an embodiment of a method at a network apparatus connecting one or more computer devices to a computer network.

In S201, a plurality of connection requests relating to monitored network traffic passing through the network apparatus is detected.

In S202, data comprising at least a host name of a host and a time of a respective connection request is extracted for each connection request based on analyzing the plurality of connection requests.

In S204, the data is analyzed to determine whether the host is in an active state, whether the host matches a domain referrer, and an amount of time from a last connection request.

In S206, in response to detecting that the host is not in the active state, the host is not matching the domain referrer, and the amount of time from the last connection request exceeds a predetermined new session threshold, a connection request is classified as a main request.

In S208, in response to detecting that the amount of time from the last connection request is below (not exceeding) a predetermined continuous session threshold, any connection requests following the main request are classified as sub-requests.

In S210, in response to detecting, for a sub-request, that a domain of a host of the sub-request in the active state does not match a current host, the sub-request is classified as a third-party request.

In S212, further action can be taken to protect the one or more computer devices from a security threat caused by any sub-requests classified as third-party requests.

In an embodiment, the main request is a request to visit a hosted website, the sub-request is a request for resources specified by content received in response to the main request, and the third-party request is a request for resources located on an external domain.

In an embodiment, the method further comprises determining initiation of the new connection request based on detecting a source port number increase for a connection request.

In an embodiment, the method further comprises dividing the sub-requests, that is the connection requests for which the amount of time from the related last requests (last request referring to the immediately preceding request of the connection request) are not exceeding the predetermined continuous session threshold into first-party requests and third-party requests, wherein the first-party request is a request for resources located on the same domain.

In an embodiment, the method further comprises setting state of the host as not being in an active state for any connection requests for which the amount of time from the last connection request exceeds the predetermined continuous session threshold, wherein in an active state main request is completed and sub-requests are ongoing.

In an embodiment, the method further comprises monitoring a state variable for each device including a last port number and a time a last request was stored.

In an embodiment, the method further comprises using one or more machine learning models for time-state domain correlation.

In an embodiment, the method further comprises decreasing amount of noise from the monitored network traffic, wherein the sources of noise comprises one or more of the following: communications initiated by operating system services, communication by user installed software and applications on household devices, multiple browsers or browser tabs communications, concurrent web page accesses, and Online Certificate Status Protocol (OCSP) queries.

In an embodiment, the extracted data further comprises a communication timestamp, communication protocol, a Media Access Control (MAC) address of a device, a source port, a complete domain name for the host, a server name indication, a Transmission Port Protocol (TCP) window size, a total length of a packet, a referrer.

In an embodiment, taking further action to protect the one or more computer devices comprises one or more of: blocking or preventing the third-party request, blocking the third-party request if the host is blacklisted, disallowing the third-party request based on determining that the main request and the sub-request does not belong to a same company.

In an embodiment, if a host is blacklisted, then it is blocked. Otherwise it may be allowed. Thus, hosts that are not in a blacklist may be allowed as also any request classified as main requests. In an embodiment, it is determined whether the main request and the sub-requests belong to a same company/organization and if so, they can be allowed while other requests are blocked.

In an embodiment, the time between connection requests is monitored. When time between the connection requests is short, for example below a predetermined threshold, then a web session is determined to be ongoing. One of the first in each session is the main request. It can also be determined that the time before a session start (i.e. between different sessions) is longer than the time between requests in a same session.

Detecting Third Party Requests in Web Traffic—Example Case

Based on study and observations on an OS networking stack, initial algorithm can be developed. First it is required to see how the usual web page is being loaded. The first request loads the main URL that is being requested by the user, service or application. Additional resources required by the initial site for its functions, advertising and others, are then loaded in a bulk.

There are several distinctive features that outline the significance and visibility of the actually visited site: time from the last request, increase in port number and hostname attributes—length of the hostname/domain. Browsable content tends to be shorter in length than automatically generated or used to provide specific functionality. It also tends to have a lesser amount of hostname parts.

For ensuring a method according to an embodiment to work and be trackable, a per-device state variable containing the last port number and time of last request is stored. In an embodiment, two constants are predefined: a new session threshold and a continuous session threshold. These constants are used in the evaluation whether the host is in active state, that is, the main request is completed, and sub-requests are ongoing.

Stream of requests are analyzed and above-mentioned information is extracted. Whenever port is increased for a request, it is determined that a new connection is initiated. Each new request can be treated as the main request when the host is not in an active state, does not match domain referrer, is a new connection and amount of time from the last request exceeds the predetermined new session threshold. When these conditions are satisfied, the main site is determined and stored in state variable.

Following requests not exceeding the predetermined continuous session threshold are divided into first party requests (with host in state and domain matching host) and third-party requests (where domain of host in state does not match current host). On exceeding the predetermined continuous session threshold, state is set to not active.

In an embodiment, the method can be further fine-tuned by using machine learning models for time-state-domain correlation. An additional dataset collection may be created on this basis. In another embodiment, other available features may also be used in determining domains, such as TCP window size, packet size, IP options.

Figure 3:
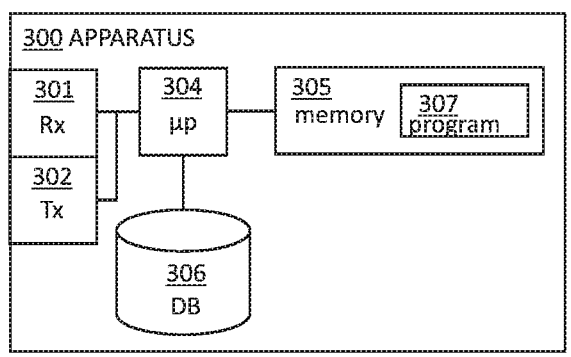
FIG. 3 is a block diagram of an apparatus, according to one embodiment.

Turning now to FIG. 3 that is showing an example of a network apparatus such as a router, a switch, a 5G modem, or other network level apparatus.

A processor 304 is provided that is configured to detect connection requests relating to monitored network traffic passing through the network apparatus. Further, the processor 304 is configured to extract data comprising at least a host name and time of the connection request based on analyzing the detected connection requests. The processor 304 is further configured to analyze the extracted data to determine whether the host is in an active state, whether the host matches a domain referrer and the amount of time from the last connection request. However, in some embodiments, this analysis can also be implemented in some other device external to the apparatus 300. In response to detecting that the host is not in an active state, the host is not matching the domain referrer and the amount of time from the last connection request exceeds a predetermined new session threshold, the processor 304 is configured to classify a connection request as a main request. In response to detecting that the amount of time from the last connection request is not exceeding/is below a predetermined continuous session threshold, the processor 304 is configured to classify any connection requests following the main request as sub-requests. In response to detecting that the domain of host in an active state does not match current host for a sub-request, the processor 304 is configured to classify the sub-request as a third-party request and to take further action to protect the one or more computer devices from a security threat caused by any sub-requests classified as third-party requests.

In an embodiment, the processor 304 is further configured to store data such as data related to the connection requests, state information and domain data to the database 306. The database 306 is shown in this example as being located at the apparatus 300, but it will be appreciated that the apparatus 304 may alternatively access a remote database. The database 304 may comprise necessary data collected from user devices.

The apparatus 300 is provided with a receiver 301 that receives the connection requests and responses. A transmitter 302 is also provided for communication with the user device and/or the outside server.

In the above description, the apparatus 300 is described as having different transmitter and receiver. It will be appreciated that these may be disposed in any suitable manner, for example in a single transmitter and receiver, a transceiver and so on. Similarly, a single processor 304 is described but it will be appreciated that the function of the processor may be performed by a single physical processor or by more than one processors.

The apparatus 300 is also provided with a non-transitory computer readable medium in the form of a memory 305. The memory may be used to store a computer program 307 which, when executed by the processor 300, causes the processor 304 to perform the functions described above. The computer program 307 may be provided from an external source. In an embodiment, at least some or even all of the functions of the method can be implemented in any apparatus, for example the user device or a server.

Example Use Case—Browsing Web

Figure 4:
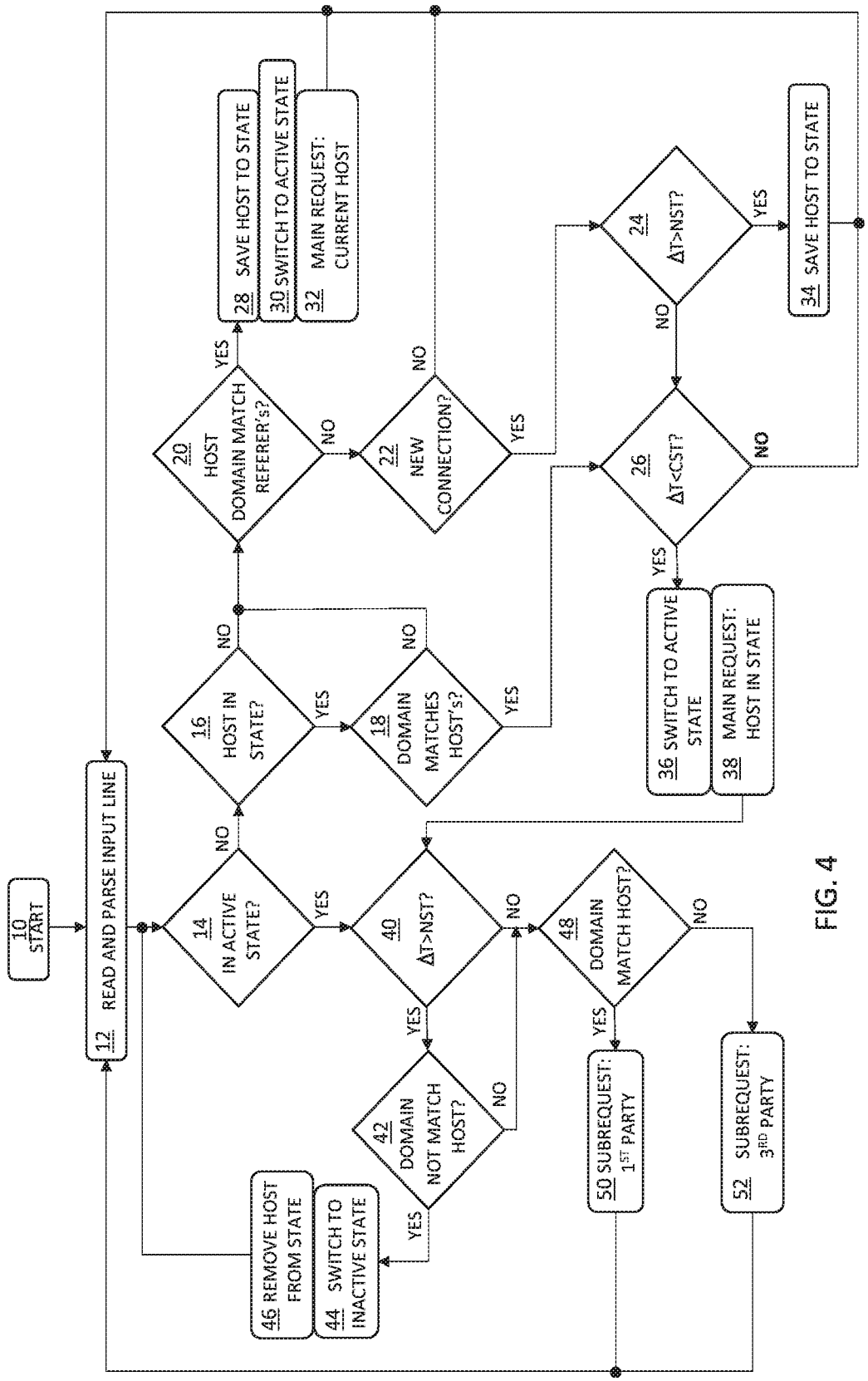
FIG. 4 a flow diagram illustrating a process for distinguishing network connection requests, according to one embodiment.

Let us turn to FIG. 4 flow diagram illustrating a process for distinguishing network connection requests, according to one embodiment.

Detection of the main request and start of session is presented by following steps 10, 12, 14, 16, 20, 22, 24, 34 of the process. User types for example mit.edu to visit the website. The state is empty, domain is not stored in state either and it is treated as a new connection initiated by a user, meaning that host is saved to state. In 12, input line is read and parsed. From 14 where it is detected that there is no active state, 16 is entered to determine whether host is in state. In response to detecting that host is not in state, 20 is entered where it is determined whether domain of host matches the referrer. This is not the case and thus, 22 is entered and after determining that this is a new connection, 24 is entered where it is determined whether time between requests exceeds a new session threshold. If this is true, then

34 is entered where the host is saved to state. If in 20, domain of host is detected to match the referrer, then 28, 30 and 32 are entered where host is saved to state, it is switched to active state and main request is current host.

Redirection is presented in process steps 10, 14, 16, 18, 26, 36, 38, 40, 48, 50. If web content is stored under web.mit.edu, user is redirected from mit.edu to web.mit.edu. Host is in state and request domain matches current hosts. According to timing (time delta is less than a continuous session threshold time), it is switched to active state (meaning that this resource is currently being actively accessed by user) and since domain of host matches current host domain (mit.edu) it qualifies as being a first-party sub-request.

Process steps 12, 14, 40, 50 show an example of how the first-party requests (requests from mit.edu) are treated by evaluating whether the new host qualifies as new session or not. Process steps 12, 14, 40, 48, 52 outline the third-party detection where domains are not matching the current host's and the request still does not qualify for a new session. This means that this is a third-party request and can be treated as a possible tracker.

Steps 42, 44 and 46 show end of process when in 40 it is detected that time delta exceeds a new session threshold. When it is detected that the domain does not match current host in 42, then in 44 it is switched to inactive state and the host is removed from state in 46.

For a website to function correctly, resources from the same domain or set of domains must be loaded. This includes images, CSS (Cascading Style Sheet) or JS (JavaScript) resources and other. Each third-party resource can be treated as a tracker, possibly adding additional functionality of social networking, advertisement etc. User who wants to experience a clean Internet browsing and leave as little of digital footprint as possible, can choose to disallow third-party requests to track his/her activities. Thus, when the user accesses the website, all the mandatory resources are loaded while third-party sub-requests can be blocked. This enables a faster and cleaner Internet browsing experience.

In example embodiments, there are provided classification systems that can perform one or more of the following functions:

Reading web requests on router level,
Reading timestamp, protocol, MAC, source port, host, TCP window size, total length of packet, referrer for each web request,
Detecting and handling data noise (OCSP, CDN, API, background app communications),
Detecting autocomplete requests,
Handling multiple sessions at once (multiple main hosts),
Making use of more available features (TCP window, packet size, IP options),
Keeping last observed port number and request time in per-device state,
Based on statistical or machine learning model determining if the current state is active in near real time fashion,
In active state doing real time analysis to detect and distinguish main requests made by user/service or application from first-party requests and third-party requests,
Building Internet domain intelligence.

Machine learning, rules and/or other machine learning models may here be utilized for estimating the current state of host. The nature of the model used by the system may be, or may incorporate elements, from one or more of the following: a neural network trained using a training data set, exact or heuristic rules (e.g. hardcoded logic), fuzzy logic based modelling, and statistical inference-based modelling. The model may be trained to consider particular patterns, data, processes, connections, and dependencies between processes.

It will be appreciated that various modifications may be made to the above described embodiments without departing from the scope of the present invention. For example, the database or analysis engine may be in separate entities to the apparatus, in which case the apparatus will send queries remotely to the analysis engine.

The steps, signaling messages and related functions described above in relation to the figures are in no absolute chronological order, and some of the steps may be performed simultaneously or in a different order. Other functions may also be executed between the steps and other signaling may be sent between the illustrated ones. Some of the steps can also be left out or replaced by a corresponding step. The system functions illustrate a procedure that may be implemented in one or more physical or logical entities.

The techniques described herein can be implemented by various means. An apparatus or system that implements one or more of the described functions may comprise not only existing means but also means for implementing one or more functions of a corresponding apparatus that is described with an embodiment. An apparatus or a system may also comprise separate means for each separate function. For example, the embodiments may be implemented in one or more modules of hardware or combinations thereof. For software, implementation can be through modules, for example such procedures and functions that perform the functions described. The software code may be stored in any suitable data storage medium that is readable by processors, computers, memory units or articles of manufacture, and may be executed by one or more processors or computers. The data storage medium or memory unit or database may be implemented within the processor or computer apparatus, or as an external part of the processor or computer apparatus.

The programming, such as executable code or instructions, electronic data, databases or other digital information may be stored into memories and can include a processor-usable medium embodied in any computer program product which can contain, store, or maintain programming, data or digital information for use by or in connection with an instruction execution system, such as the processor.

An embodiment provides a non-transitory computer-readable medium comprising stored program code comprised of computer-executable instructions. The computer program code comprises a code for detecting connection requests relating to monitored network traffic passing through the network apparatus, a code for extracting data comprising at least a host name and time of the connection request based on analyzing the detected connection requests, a code for analyzing the extracted data to determine whether the host is in an active state, whether the host matches a domain referrer and the amount of time from the last connection request, a code for classifying a connection request as a main request in response to detecting that the host is not in an active state, the host is not matching the domain referrer and the amount of time from the last connection request exceeds a predetermined new session threshold, a code for classifying any connection requests following the main request as sub-requests in response to detecting that the amount of time from the last connection request is below a predetermined continuous session threshold, a code for classifying the sub-request as a third-party request in response to detecting that the domain of host in an active state does not match current host for a sub-request. In an embodiment, it further comprises a code for taking further action to protect the one or more computer devices from a security threat caused by any sub-requests classified as third-party requests.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

What is claimed is:

1. A method comprising:
    detecting, in monitored network traffic passing through a network apparatus, a first connection request originating from a computer device;
    extracting data comprising at least a host name of a first host identified in the first connection request and a time of the first connection request;
    determining that the first host is not in an active state;
    in response to determining that the first host is not in the active state and an amount of time from a last connection request made by the computer device exceeds a predetermined new session threshold, classifying the first connection request as a main request and storing information to indicate that the first host is in the active state;
    receiving a subsequent second connection request from the computer device;
    determining that the second connection request occurred within a predetermined continuous session threshold from the time of the first connection request;
    in response to determining that the second connection request occurred within the predetermined continuous session threshold and that the host is in the active state, classifying the second connection request as a sub-request;
    in response to detecting, for the sub-request, that a domain of a second host identified in the sub-request does not match the first host, classifying the sub-request as a third-party request; and
    in response to classifying the sub-request as a third-party request, accessing information regarding the second host and, based on the information, blocking the third-party request.

2. The method according to claim 1, wherein the main request is a request to visit a hosted website; the sub-request is a request for resources specified by content received in response to the main request; and the third-party request is a request for resources located on an external domain.

3. The method according to claim 1, further comprising determining initiation of a new connection request based on detecting a source port number increasing for a connection request.

4. The method according to claim 1, further comprising dividing subsequent sub-requests into first-party requests and third-party requests, wherein a first-party request is a request for resources located on a same domain.

5. The method according to claim 1, further comprising setting a state of host as not being in the active state for any connection requests for which the amount of time from the last connection request exceeds the predetermined continuous session threshold, wherein in the active state the main request is completed and the sub-requests are ongoing.

6. The method according to claim 1, further comprising monitoring, for one or more computer devices of a computer network system, a state variable for each computer device including a last port number and a time a last request was stored.

7. The method according to claim 1, further comprising using one or more machine learning models for time-state domain correlation.

8. The method according to claim 1, further comprising decreasing an amount of noise from the monitored network traffic, wherein sources of the noise comprise one or more of the following: communications initiated by operating system services, communications by user-installed software and applications on household devices, multiple browsers or browser tabs communications, concurrent web page accesses, Online Certificate Status Protocol (OCSP) queries.

9. The method according to claim 1, wherein the data further comprises at least one of: a communication timestamp, a communication protocol, a Media Access Control (MAC) address of a device, a source port, a complete domain name for the host, a server name indication, a Transmission Port Protocol (TCP) window size, a total length of a packet, and a referrer.

10. An apparatus in a computer network system comprising:
    one or more processors; and
    a non-transitory computer-readable medium comprising stored program code, the program code comprised of computer-executable instructions that, when executed by the one or more processors, cause the one or more processors to:
    detect, in monitored network traffic passing through the apparatus, a first connection request originating from a computer device;
    extract data comprising at least a host name of a first host identified in the first connection request and a time of the first connection request;
    determine that the first host is not in an active state;
    in response to determining that the first host is not in the active state and an amount of time from a last connection request made by the computer device exceeds a predetermined new session threshold, classify the first connection request as a main request and store information to indicate that the first host is in the active state;
    receive a subsequent second connection request from the computer device;
    determine that the second connection request occurred within a predetermined continuous session threshold from the time of the first connection request;
    in response to determining that the second connection request occurred within the predetermined continuous session threshold and that the host is in the active state, classify the second connection request as a sub-request;
    in response to detecting, for the sub-request, that a domain of a second host identified in the sub-request does not match the first host, classify the sub-request as a third-party request; and
    in response to classifying the sub-request as a third-party request, access information regarding the second host and, based on the information, block the third-party request.

11. The apparatus according to claim 10, wherein the main request is a request to visit a hosted website; the sub-request is a request for resources specified by content received in response to the main request; and the third-party request is a request for resources located on an external domain.

12. The apparatus according to claim 10, the one or more processors being further configured to set a state of host as not being in the active state for any connection requests for which the amount of time from the last connection request exceeds the predetermined continuous session threshold, wherein in the active state the main request is completed and the sub-requests are ongoing.

13. The apparatus according to claim 10, the one or more processors being further configured to use one or more machine learning models for time-state domain correlation.

14. The apparatus according to claim 10, the one or more processors being further configured to decrease an amount of noise from the monitored network traffic, wherein sources of the noise comprise one or more of the following: communications initiated by operating system services, communications by user-installed software and applications on household devices, multiple browsers or browser tabs communications, concurrent web page accesses, and Online Certificate Status Protocol (OCSP) queries.

15. The apparatus according to claim 10, wherein the data further comprises a communication at least one of: a timestamp, a communication protocol, a Media Access Control (MAC) address of a device, a source port, a complete domain name for the host, a server name indication, a Transmission Control Protocol (TCP) window size, a total length of packet, and a referrer.

16. A non-transitory computer-readable medium comprising stored program code, the program code comprised of computer-executable instructions that, when executed by a processor, cause the processor to:

detect, in monitored network traffic passing through a network apparatus, a first connection request originating from a computer device;

extract data comprising at least a host name of a first host identified in the first connection request and a time of the first connection request;

determine that the first host is not in an active state;

in response to determining that the first host is not in the active state and an amount of time from a last connection request made by the computer device exceeds a predetermined new session threshold, classify the first connection request as a main request and store information to indicate that the first host is in the active state;

receive a subsequent second connection request from the computer device;

determine that the second connection request occurred within a predetermined continuous session threshold from the time of the first connection request;

in response to determining that the second connection request occurred within the predetermined continuous session threshold and that the host is in the active state, classify the second connection request as a sub-request;

in response to detecting, for the sub-request, that a domain of a second host identified in the sub-request does not match the first host, classify the sub-request as a third-party request; and in response to classifying the sub-request as a third-party request, access information regarding the second host and, based on the information, block the third-party request.

* * * * *